(12) United States Patent
Simione

(10) Patent No.: US 11,229,276 B2
(45) Date of Patent: Jan. 25, 2022

(54) BRACKET SYSTEM FOR MOUNTING OBJECTS ON BACKPACK FRAME

(71) Applicant: Redsled, Inc., Stuart, FL (US)

(72) Inventor: Jason Simione, Stuart, FL (US)

(73) Assignee: Redsled, Inc., Dania Beach, FL (US)

( * ) Notice: Subject to any disclaimer, the term of this patent is extended or adjusted under 35 U.S.C. 154(b) by 0 days.

(21) Appl. No.: 17/076,252

(22) Filed: Oct. 21, 2020

(65) Prior Publication Data

US 2021/0112953 A1    Apr. 22, 2021

Related U.S. Application Data

(60) Provisional application No. 62/923,749, filed on Oct. 21, 2019.

(51) Int. Cl.
*A45F 3/10* (2006.01)
*B60P 7/08* (2006.01)
*B60R 11/00* (2006.01)

(52) U.S. Cl.
CPC .............. *A45F 3/10* (2013.01); *B60P 7/0807* (2013.01); *A45F 2200/0566* (2013.01); *B60R 2011/0071* (2013.01)

(58) Field of Classification Search
CPC .. A45F 3/10; A45F 2200/0566; A47B 81/005; A47B 1/02; A47B 2097/008; B60R 7/14; B60R 2011/0071; B63C 2011/026; B60P 7/0823
USPC ........ 224/250, 913, 922, 546; 248/201, 568, 248/499, 500, 503, 503.1, 505, 506; 211/94.05, 63, 64, 75, 85.18; 410/97
See application file for complete search history.

(56) References Cited

U.S. PATENT DOCUMENTS

| | | | | |
|---|---|---|---|---|
| 3,659,761 | A * | 5/1972 | Wesson ...................... | B62J 7/02 224/442 |
| 3,894,707 | A * | 7/1975 | Heard ....................... | G09F 7/18 248/230.9 |
| 4,310,110 | A * | 1/1982 | Dexter ...................... | A45F 3/08 224/246 |
| 5,062,184 | A * | 11/1991 | Rowland ................ | H02G 11/02 24/16 PB |
| 5,222,701 | A * | 6/1993 | Rowland .............. | B65H 75/366 248/222.13 |
| 5,338,136 | A * | 8/1994 | Hetchler ................. | B60P 7/083 24/68 CD |

(Continued)

*Primary Examiner* — Justin M Larson
(74) *Attorney, Agent, or Firm* — Fleit Intellectual Property Law; Jon Gibbons

(57) ABSTRACT

A bracket system for mounting objects on to a mounting frame such as a backpack frame or a vehicle equipment mount. The bracket system includes at least two sets of brackets. Each of the sets of brackets has three major components. The first major component is a flexible strap with a first end and second end, the second end formed with a T-shape. The second major is a right-hand bracket with a flexible strap anchor plate for affixing the first end of the flexible strap thereto, the first bracket further including a set of openings along one side for mechanically fastening to the mounting frame. The third component is a left-hand bracket formed with a variety of slots for receiving the second end of the flexible strap with the T-shape along one side and a set of openings along second side for mechanically fastening to the mounting frame.

11 Claims, 11 Drawing Sheets

(56) References Cited

U.S. PATENT DOCUMENTS

| | | | | |
|---|---|---|---|---|
| 5,913,467 A * | 6/1999 | Berg | ............ | A62B 9/04 224/628 |
| 6,202,977 B1 * | 3/2001 | Chapman | ............ | F24H 9/06 248/230.9 |
| 6,666,635 B2 * | 12/2003 | Holt | ............ | B60P 7/0815 410/101 |
| 6,793,449 B1 * | 9/2004 | Simpson | ............ | B60P 7/0807 410/100 |
| 6,799,927 B2 * | 10/2004 | Wheatley | ............ | B61D 45/001 410/104 |
| 6,857,820 B2 * | 2/2005 | Jacoway | ............ | B63C 11/02 224/627 |
| 6,913,286 B2 * | 7/2005 | Kramer | ............ | B60R 7/14 211/64 |
| D512,903 S * | 12/2005 | Gallien | ............ | D8/349 |
| 7,175,149 B2 * | 2/2007 | Gallien | ............ | A47B 97/00 248/499 |
| 7,438,510 B1 * | 10/2008 | Ledford | ............ | B60P 7/0807 410/106 |
| 7,703,645 B2 * | 4/2010 | Moskun | ............ | A45F 3/08 224/581 |
| 8,020,737 B2 * | 9/2011 | Sweeney | ............ | B60R 9/048 224/324 |
| 8,657,127 B2 * | 2/2014 | Diaz, Jr. | ............ | A01K 97/08 211/64 |
| 8,678,206 B2 * | 3/2014 | Kubiniec | ............ | A47B 81/005 211/64 |
| 10,251,467 B2 * | 4/2019 | Donhauser | ............ | B62J 99/00 |
| 10,357,097 B1 * | 7/2019 | Goldberg | ............ | A45F 3/10 |
| 10,463,137 B2 * | 11/2019 | Simione | ............ | A45F 3/08 |
| 10,470,553 B1 * | 11/2019 | Gonzalez | ............ | A45F 3/08 |
| D902,786 S * | 11/2020 | Johnson | ............ | D12/106 |
| 11,091,103 B2 * | 8/2021 | Winkler | ............ | B60R 11/06 |
| 11,110,867 B2 * | 9/2021 | Franklin | ............ | A47F 7/0021 |
| 2014/0097222 A1 * | 4/2014 | Robinson | ............ | B60R 7/14 224/401 |
| 2015/0320184 A1 * | 11/2015 | Bal | ............ | A45F 3/00 224/261 |
| 2021/0112953 A1 * | 4/2021 | Simione | ............ | A45F 3/10 |

\* cited by examiner

BRACKET SYSTEM FOR MOUNTING OBJECTS ON BACKPACK FRAME

CROSS-REFERENCE TO RELATED APPLICATIONS

This patent application is a based on and claims priority from U.S. Provisional Patent Application No. 62/923,749, filed on Oct. 21, 2019, which is hereby incorporated by reference in its entirety.

BACKGROUND OF THE INVENTION

The present invention generally relates to the field of backpacks, and more particularly relates to the field of brackets for use with backpack frame systems and other mounts.

Backpacks have been used for many years to carry equipment. A wide variety of equipment including weapons, radios, clothing, food, medical and other provisions are carried in backpacks.

SUMMARY OF THE INVENTION bracket system for mounting objects on to a mounting frame such as a backpack frame or a vehicle equipment mount. The bracket system includes at least two sets of brackets. Each of the sets of brackets has three major components. The first major component is a flexible strap with a first end and second end, the second end formed with a T-shape. The second major is a right-hand bracket with a flexible strap anchor plate for affixing the first end of the flexible strap thereto, the first bracket further including a set of openings along one side for mechanically fastening to the mounting frame. The third component is a left-hand bracket formed with a variety of slots for receiving the second end of the flexible strap with the T-shape along one side and a set of openings along second side for mechanically fastening to the mounting frame.

The brackets are composed of metal, composite, plastic, or a combination thereof.

In one example the right-hand bracket and left-hand bracket wherein the first bracket and the second bracket are substantially U-shaped when viewed from an end and each section of the U-shape is the polygon with five sides.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms "including" and/or "having", as used herein, are defined as comprising (i.e., open language). The term "coupled", as used herein, is defined as connected, although not necessarily directly, and not necessarily mechanically. The term fastening means includes soldering, brazing, welding, glue, epoxy, and mechanical fasters such as bolts, screws and riveting or any combination thereof.

Figure 1:
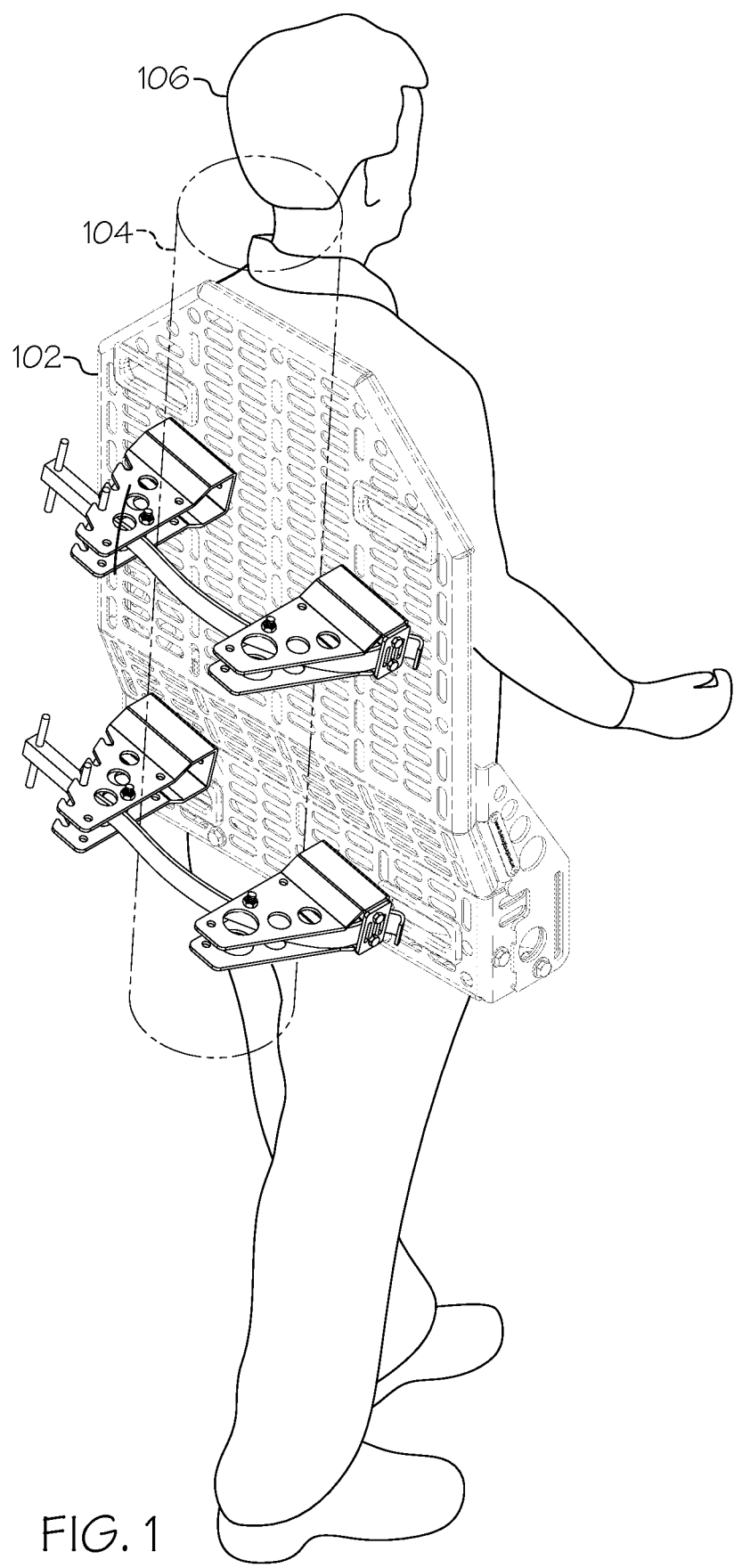
FIG. 1 is a perspective view of the backpack frame being worn by a user carrying a large cylindrical item.

Turning now to FIG. 1 is a perspective view of a backpack frame 102 being worn by a user 106 carrying an object 104, especially a large odd shaped objects, such as a radios, radar, or a cylindrical object such as a weapon. In one example the backpack frame 102 is disclosed in U.S. patent application Ser. No. 15/906,376, entitled Backpack Frame with inventor Jason Simione, now U.S. Pat. No. 10,463,137, the teachings of which is hereby incorporated by reference in its entirety. It is important to note that the mounting system disclosed herein is applicable to other backpack frames and mounts, such as, vehicle equipment mounts.

Figure 2:
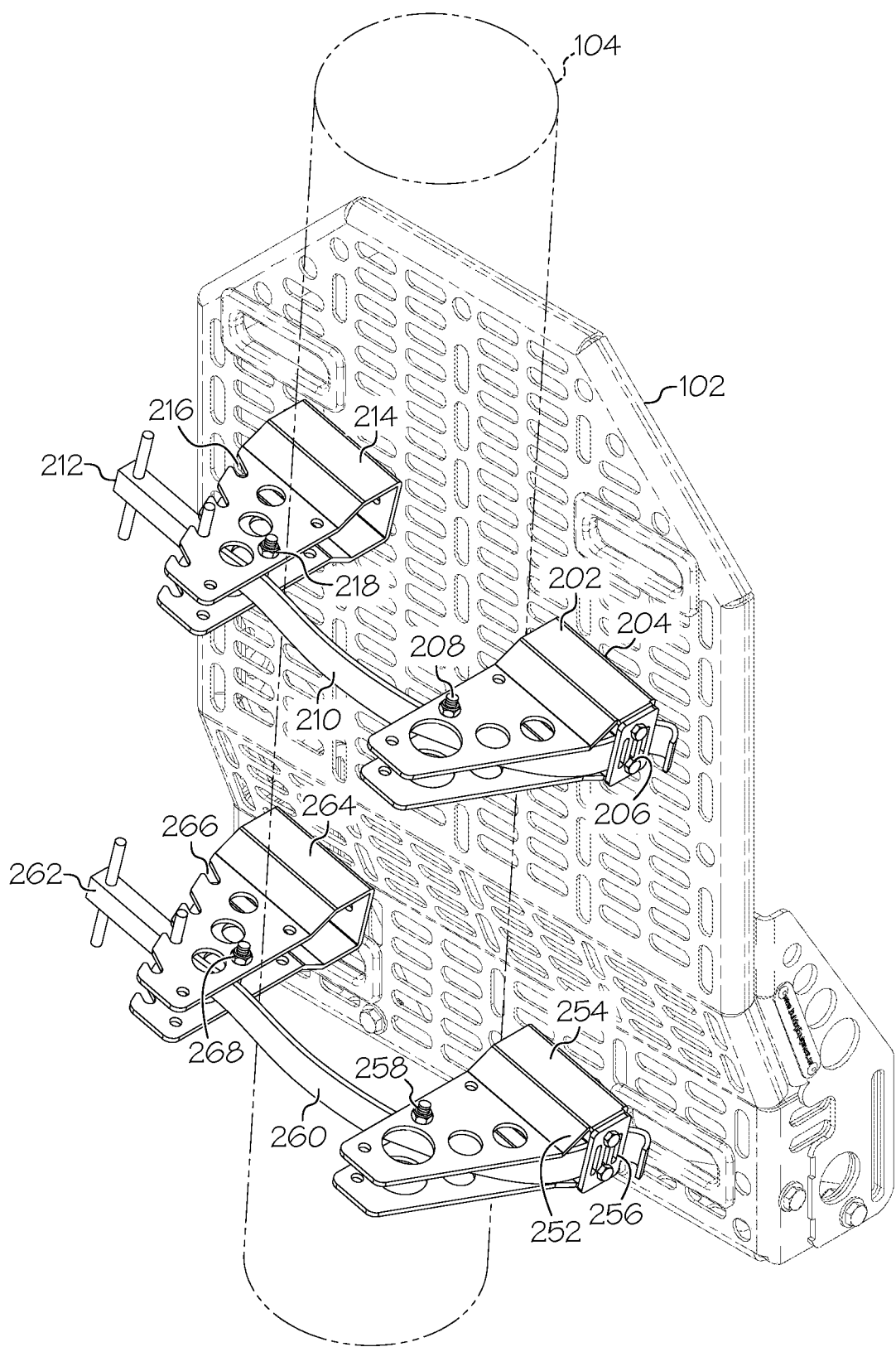
FIG. 2 is an elevational view of the brackets mounted to a backpack frame.

FIG. 2 is an elevational view of two sets of brackets 202, 252, mounted to a backpack frame 102 thereof for carrying a large cylindrical object 104.

Each of the two sets of brackets 202, 252 has corresponding major components as follows:

first brackets 204, 254 with flexible strap anchor plates 206, 256;

second brackets 214, 264 with a series of slots 214, 264 formed therein as shown.

flexible strap 210, 260 with T-shaped ends 212, 262; and fasteners 208, 218, 258, 268 such as bolts, to keep the mounting brackets 204, 254, 214, 264 from being spread open in the area in which the flexible strap is positioned.

The mounting brackets 204, 254, 214, 264 can be made of any material including organic and inorganic compounds, metal, metal alloys, plastic, composites or a combination thereof. In this example the brackets are made of aluminum. The flexible strap likewise can me made of any material including organic and inorganic compounds, metal, metal alloys, plastic, composites or a combination thereof. In this example the brackets are made of synthetic rubber.

Figure 3:
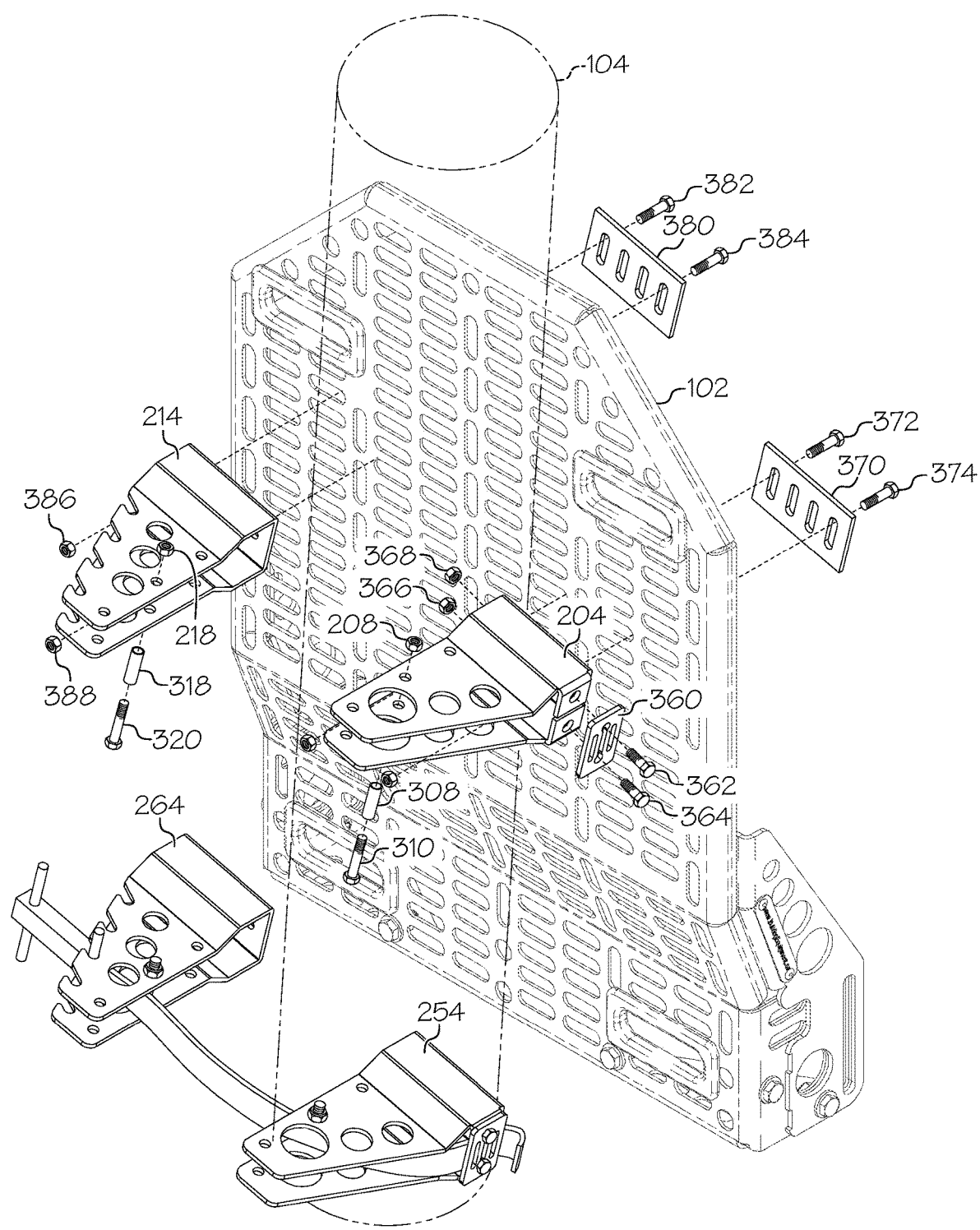
FIG. 3 is an elevational explosion view of the brackets mounted to a backpack frame.

Turning now to FIG. 3 is elevational explosion view of the brackets 204, 254, 214, 264 mounted to a backpack frame 102. Each of the mounting brackets includes a corresponding bracket plate. More specifically shown are mounting brackets 204, 214 and corresponding bracket back plate 370, 380. Each bracket back plate 370, 380 is fastened to the frame 102 using a set of fasteners 372, 374, 382, 384. Although the fasteners in this example are shown as bolts, other types of fasteners including clips, rivets, binding posts, retaining rings, clamps are within the true scope of the present invention.

Figure 4:
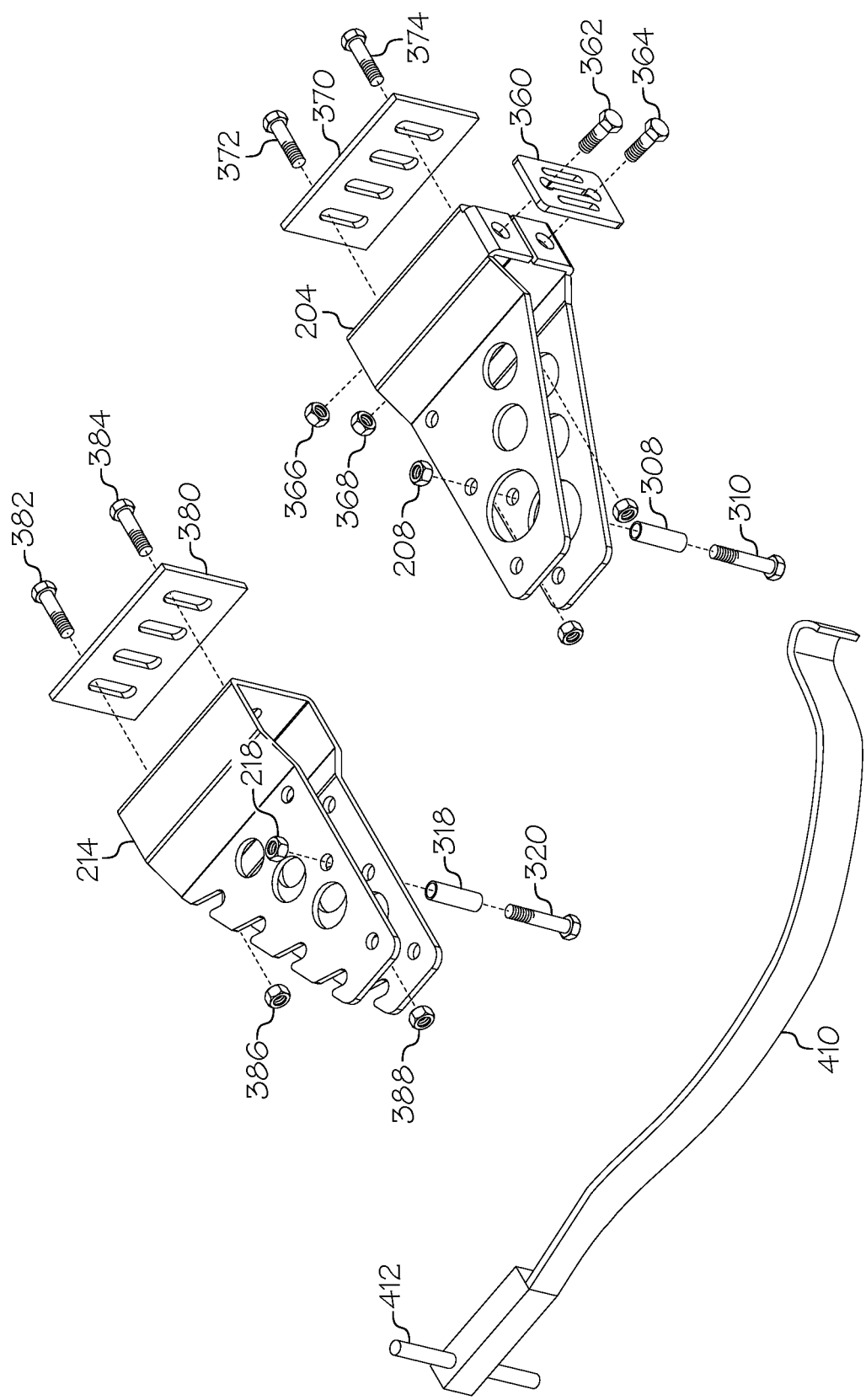
FIG. 4 is an elevational explosion view of the brackets of FIG. 3.

Shown in FIG. 3 is a flexible strap anchor plate 360 with two fasteners 362, 364 for holding one end of the flexible strap 210 (shown in FIGS. 2) and 410 (shown in FIG. 4).

Also shown in FIG. 3 are fasteners 310, 320, fastener sleeve 308, 318 and fastener nuts 208, 218 to keep the brackets 204, 254, 214, 264 from bending open or closed during use. Although the fasteners 208, 218 in this example are shown as bolts, other types of fasteners including clips, rivets, binding posts, retaining rings, clamps are within the true scope of the present invention.

Figure 21:
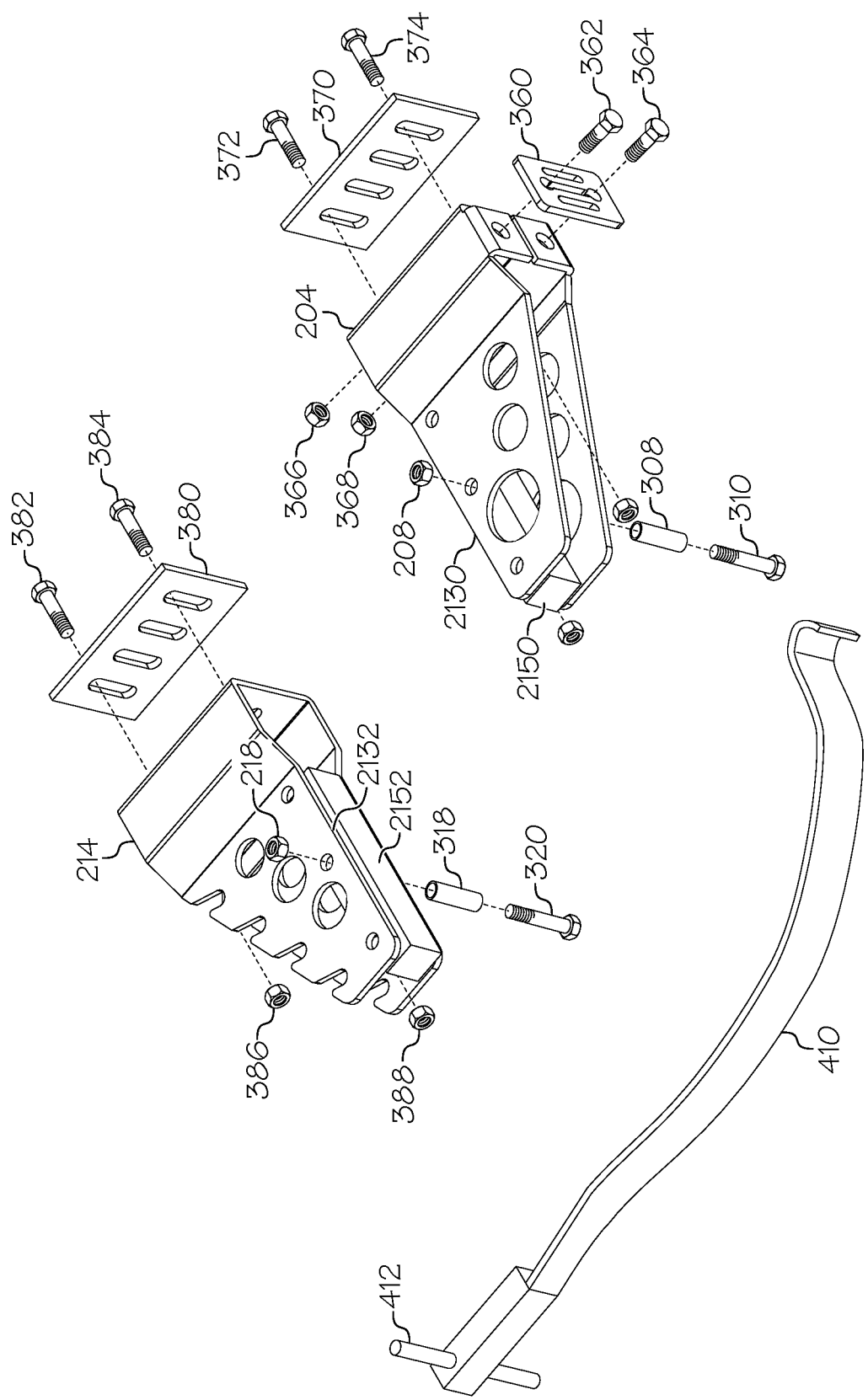
FIG. 21 is another embodiment of FIG. 4 illustrating cushioning material.

FIG. 4 is an elevational explosion view of the brackets of FIG. 3 showing more of the details with backpack frame 102 removed. In one embodiment, as shown in FIG. 21, cushioning material 2150, 2152, such as a synthetic rubber, is disposed along the sides of 2130, 2132 each bracket 204, 214, closest to the object 104 being carried. This cushioning material 2150, 2152 can be made to fit within each of the two parallel U-shaped sides 2130, 2132 of each bracket 204, 214 and protrude out towards the object to be held. The purpose of this cushioning material is to prevent brackets 204, 204 from scratching, abrading or otherwise damaging the object 104.

Figure 5:
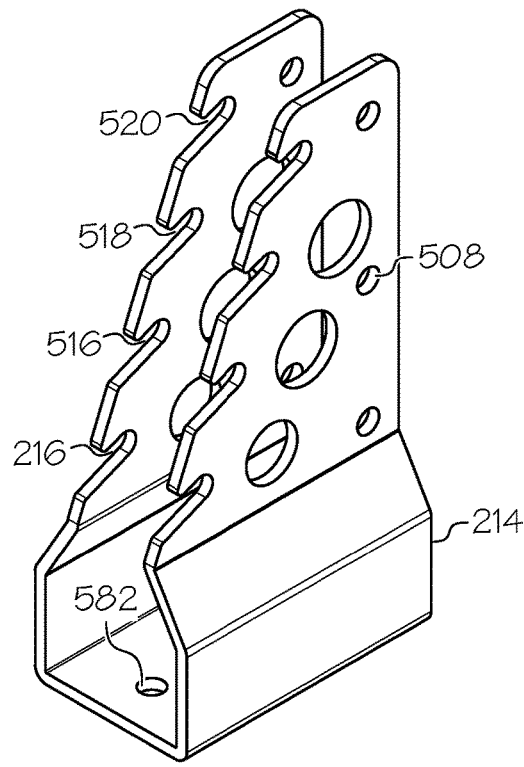
FIG. 5 is a first elevational view of one of the first bracket of FIG. 2.
Figure 6:
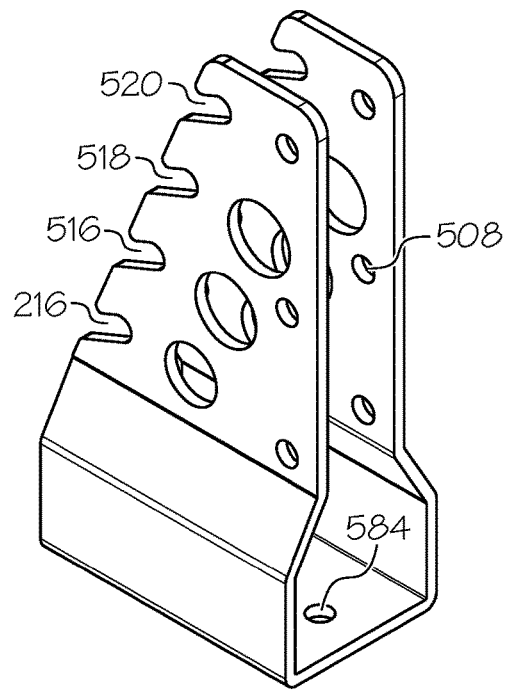
FIG. 6 is a second elevational view of the first bracket of FIG. 5.
Figure 7:
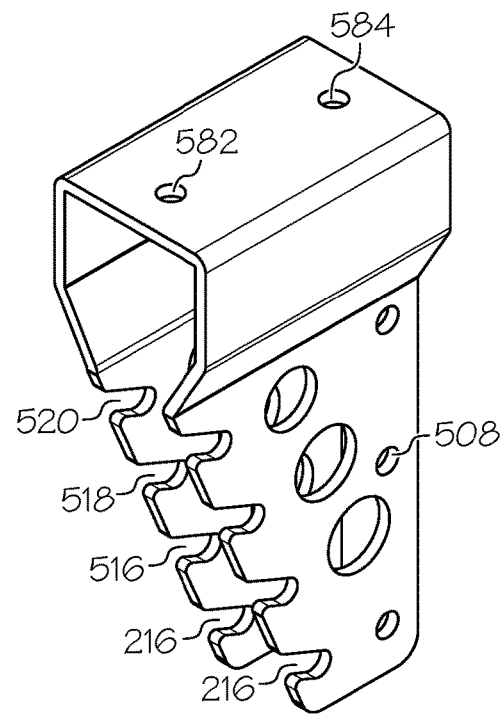
FIG. 7 is a third elevational view of the first bracket of FIG. 5.
Figure 8:
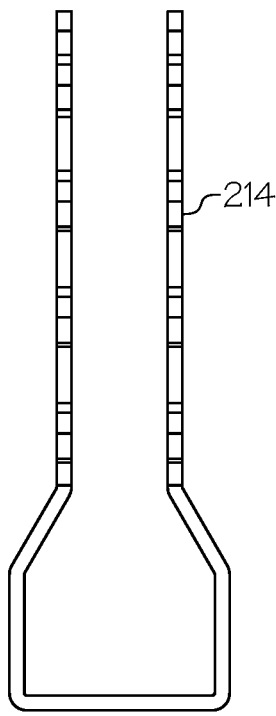
FIG. 8 is a side end view of the first bracket of FIG. 5.
Figure 9:
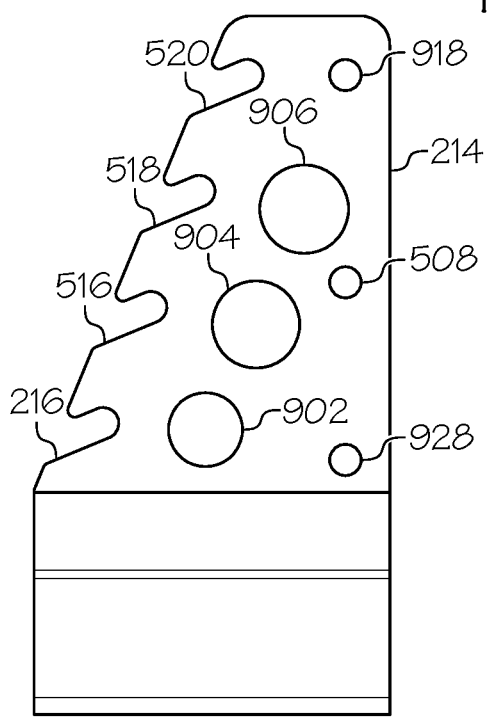
FIG. 9 is a side view of the first bracket of FIG. 5.
Figure 10:
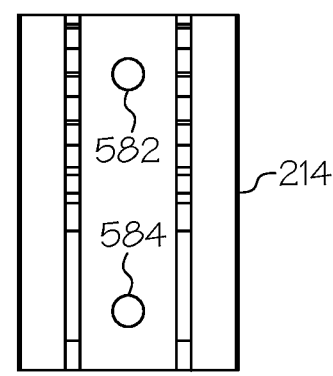
FIG. 10 is a bottom view of the first bracket of FIG. 5.

Turning now to FIG. 5 is a first elevational view of one of the first bracket of FIG. 2. FIG. 6 is a second elevational view of the first bracket 214 of FIG. 5. FIG. 7 is a third elevational view of the first bracket 214 of FIG. 5. FIG. 8 is a side end view of the first bracket 214 of FIG. 5. FIG. 9 is a side view of the first bracket 214 of FIG. 5 and FIG. 10 is a bottom view of the first bracket of FIG. 5.

Figure 15:
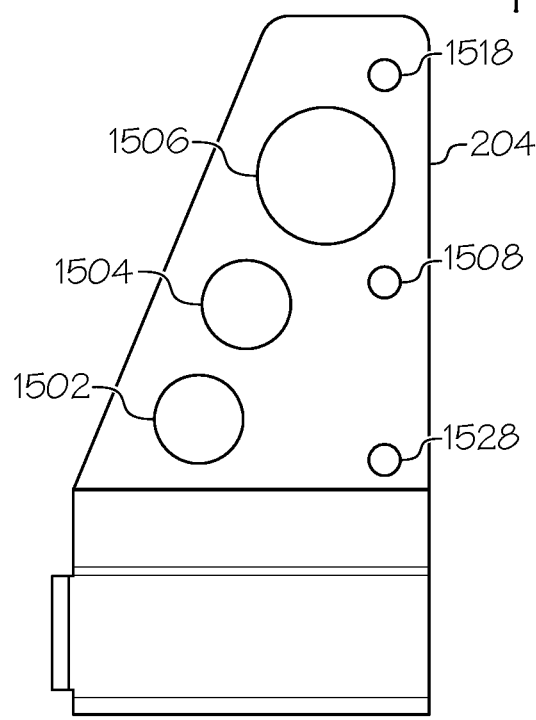
FIG. 15 is a side view of the second bracket of FIG. 11.

Note in one example that brackets 204, 214 as shown in FIG. 9 and FIG. 15 respectively are polygons with five sides where at least four of the sides are parallel to each other. More specifically, brackets 204, 214 are substantially a right triangular shape with a rectangular shaped bottom portion.

Figure 14:
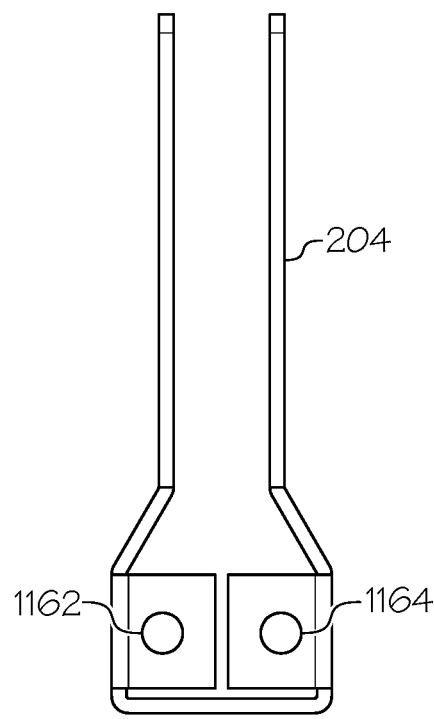
FIG. 14 is a side end view of the second bracket of FIG. 11.

Also note that 204, 214 as shown in FIG. 8 and FIG. 14 are substantially U-shaped when viewed from an end and each section of the U-shape is the polygon with five sides as shown in FIG. 9 and FIG. 15. The U-shape is formed with a first section and a second section formed parallel to each other and with a width at least as wide as a width of the flexible strap 210, 260.

Moreover as shown in FIG. 5, FIG. 9 and FIG. 11, FIG. 15 brackets 214, 204 there are series of holes 508, 918, 928, 1108, and 1508, 1518, 1528 and that align with the other section of the U-shape to allow a faster to pass-thru. The holes 1502, 1504, and 1506 shown in FIG. 15 are primarily to reduce the weight of the brackets.

Note the slots 216, 266, 516, 518, 520 are formed to accept the T-shaped ends 212, 262. The T-shaped ends 212, 262 and 412 (shown in FIG. 4) are formed by including a cylindrical piece in an end of flexible strap 260. The cylindrical piece can be made of metal, metal allow, plastic, composite or a combination thereof. Also shown are a series of holes 508, 918 and 928 for accepting fasteners 208, 218. Further shown are a series of holes 902, 904, 906 to help reduce the weight of the first bracket 204. In FIG. 10, shown are holes 582, 584 for fasteners 382, 384 of FIG. 3.

Figure 11:
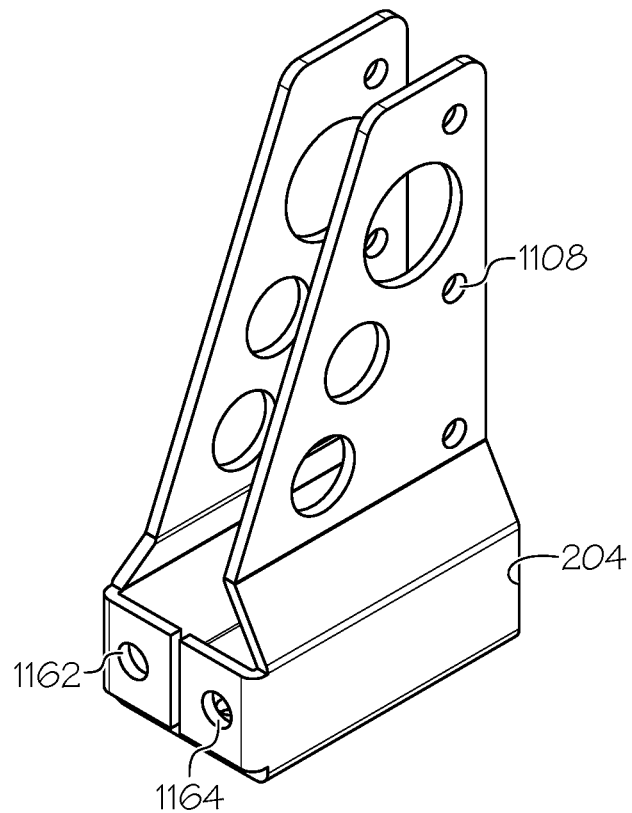
FIG. 11 is a first elevational view of one of the second bracket of FIG. 2.
Figure 12:
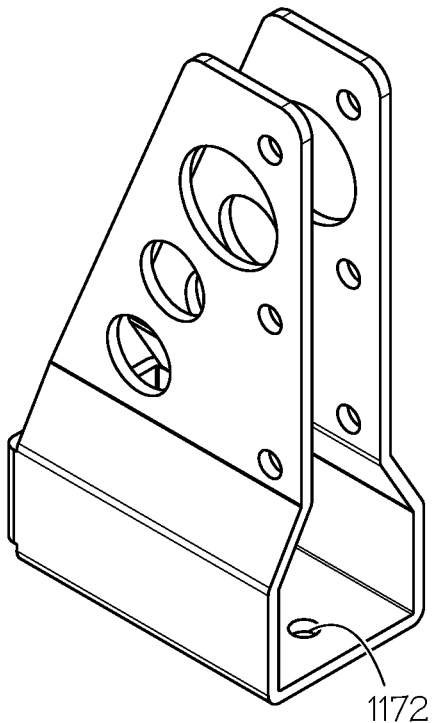
FIG. 12 is a second elevational view of the second bracket of FIG. 11.
Figure 13:
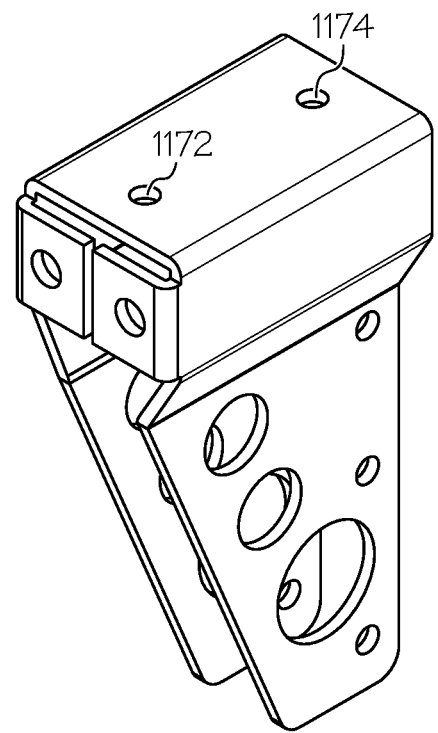
FIG. 13 is a third elevational view of the second bracket of FIG. 11.
Figure 16:
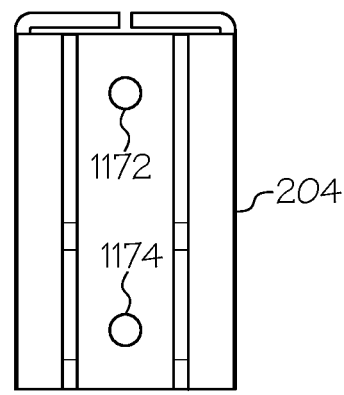
FIG. 16 is a bottom view of the second bracket of FIG. 11.

Turning now to FIG. 11 is a first elevational view of one of the second bracket 204 of FIG. 2. FIG. 12 is a second elevational view of the second bracket 204 of FIG. 11. FIG. 13 is a third elevational view of the second bracket 204 of FIG. 11. FIG. 14 is a side end view of the second bracket 204 of FIG. 11. FIG. 15 is a side view of the second bracket 204 of FIG. 11. FIG. 16 is a bottom view of the second bracket 204 of FIG. 11. Shown are holes 1162, 1164 to mechanically fasten with flexible strap anchor 360, with fasteners 362, 364 along with perforated blocks for holding the fasteners, such as nuts 366, 368 of FIG. 3. Also shown are holes 1172, 1174 for fasteners 372, 374 of FIG. 3.

Figure 17:
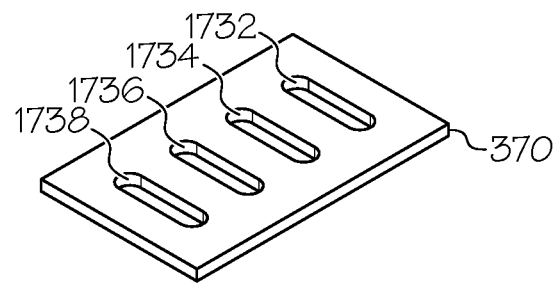
FIG. 17 is a perspective view of the bracket back plate of FIG. 3.
Figure 18:
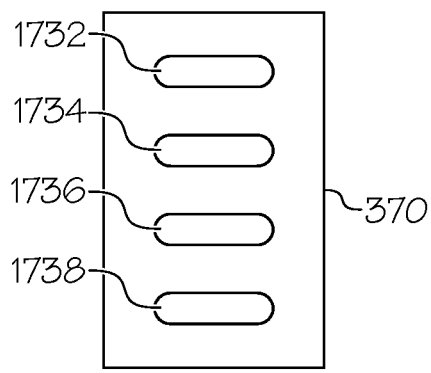
FIG. 18 is a front view of the bracket back plate of FIG. 17.

FIG. 17 is a perspective view of the bracket back plate 370 of FIG. 3. FIG. 18 is a front view of the bracket back plate 370 of FIG. 17. A series of slots 1732, 1734, 1736, and 1738 are formed as shown for accommodating fasteners 372, 374, 382, 384 and the associated perforated blocks for holding the fasteners, such as nuts 386, 388 of FIG. 3.

Figure 19:
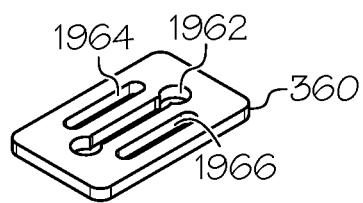
FIG. 19 is a perspective view of the flexible strap anchor plate of FIG. 3.
Figure 20:
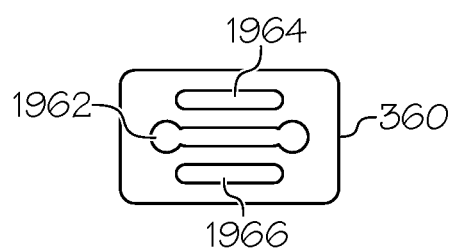
FIG. 20 is a front view of the flexible strap anchor plate of FIG. 19.

FIG. 19 is a perspective view of the flexible strap anchor plate 360 of FIG. 3. FIG. 20 is a front view of the flexible strap anchor plate 360 of FIG. 19. A series of slots 1962, 1964, and 1966 are formed as shown for accommodating fasteners 362, 364 of FIG. 3.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A bracket system for mounting objects on to a mounting frame, the bracket system comprising:
    at least two sets of brackets, each of the at least two sets of brackets including
        a flexible strap with a first end and second end, the second end formed with a T-shape;
        a first bracket with a flexible strap anchor plate for affixing the first end of the flexible strap thereto, the first bracket further including a set of openings along one side for mechanically fastening to the mounting frame; and a second bracket formed with a variety of slots for receiving the second end of the flexible strap with the T-shape along one side and a set of openings along second side for mechanically fastening to the mounting frame.

2. The bracket system of claim 1, wherein each of the first bracket and the second bracket is a polygon with five sides, with at least two pairs of the sides being parallel to each other.

3. The bracket system of claim 2, wherein the first bracket and the second bracket are substantially U-shaped when viewed from an end and each section of the U-shape is the polygon with five sides.

4. The bracket system of claim 3, wherein each of the first bracket and the second bracket are substantially U-shaped with two parallel sections, each of the two parallel sections formed as the polygon with five sides including a series of holes therein, at least one set of the series of holes in each of the two parallel sections aligned to permit a fastener to pass-therebetween.

5. The bracket system claim 1, wherein the at least two sets of brackets are composed of metal, composite, plastic, or a combination thereof.

6. The bracket system claim 1, wherein the mounting frame is one of a backpack frame or a vehicle equipment mount.

7. The bracket system claim 1, wherein the object to be mounted by the bracket system is cylindrical in shape.

8. A bracket system for mounting objects on to a frame, the bracket system comprising:
  at least two pairs of brackets, each of the at least two pairs of brackets including
  a flexible strap with a first end and second end, the second end formed with a T-shape;
  a first bracket with a with a cross-sectional U-shape formed with a first section and a second section formed parallel to each other and with a width at least as wide as a width of the flexible strap, and each of the first section and the second section are a right triangular shape with a top truncated vertex and a flexible strap anchor plate for holding the first end of the flexible strap and one side of the first bracket including a set of openings for mechanically fastening to the frame; and
  a second bracket with a with a cross-sectional U-shape formed with a first section and a second section formed parallel to each other, and each of the first section and the second section are a right triangular shape with a top truncated vertex and a longest edge of the right triangular shape formed with a variety of slots for receiving the second end of the flexible strap with the T-shape therein and a second side of the second bracket including a set of openings for mechanically fastening to the frame.

9. The bracket system claim 8, wherein the at least two sets of brackets are composed of metal, composite, plastic, or a combination thereof.

10. The bracket system claim 8, wherein the mounting frame is one of a backpack frame or a vehicle equipment mount.

11. The bracket system claim 8, wherein the object to be mounted by the bracket system is cylindrical in shape.

\* \* \* \* \*